J. W. CROWLEY.
CLUTCH.
APPLICATION FILED FEB. 26, 1915.
1,165,392.
Patented Dec. 28, 1915.
2 SHEETS—SHEET 1.
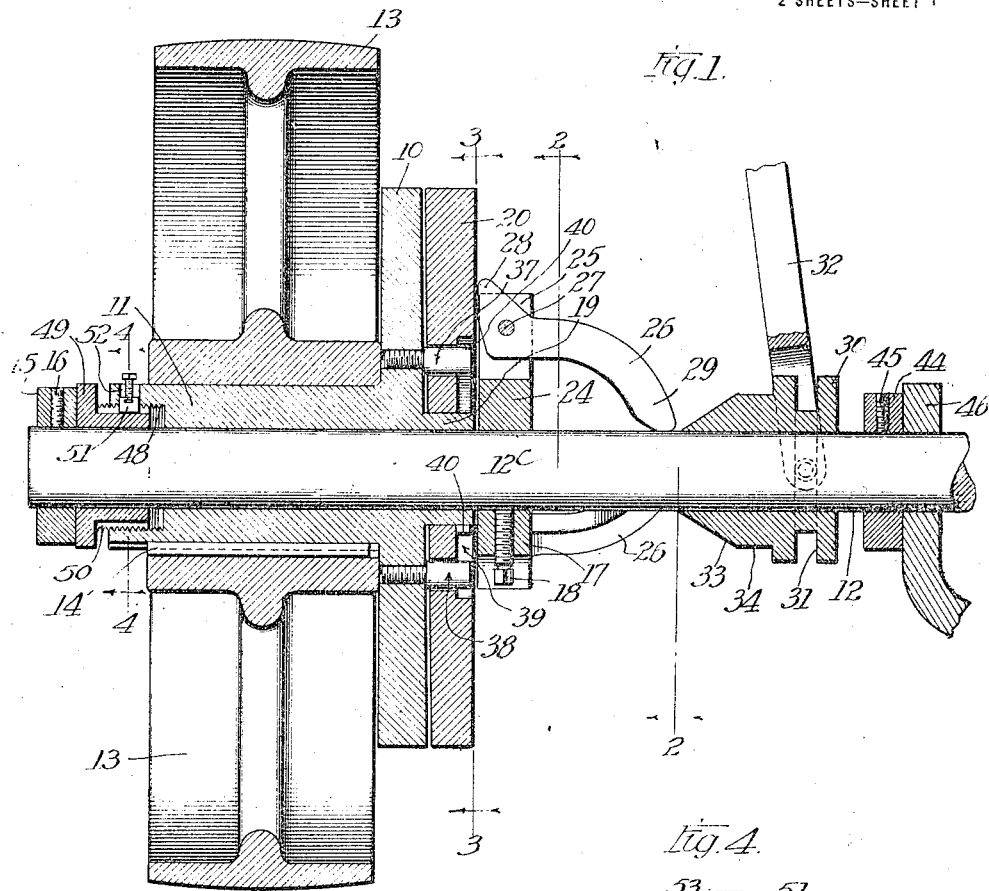
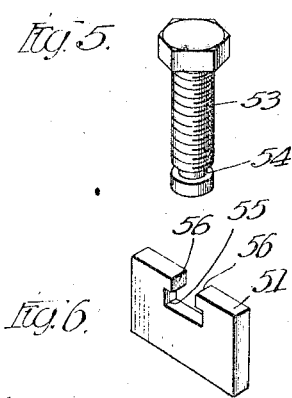
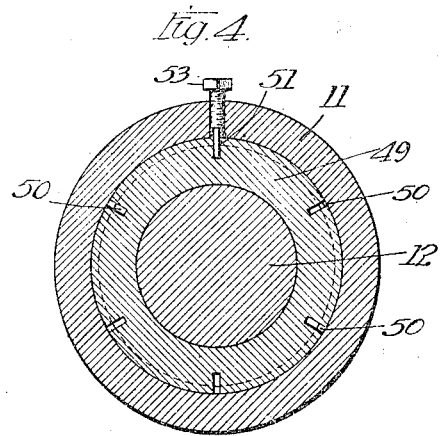
Witnesses:
Robert H. Weir
Arthur W. Carlson
Inventor
John W. Crowley

J. W. CROWLEY.
CLUTCH.
APPLICATION FILED FEB. 26, 1915.

1,165,392.

Patented Dec. 28, 1915.
2 SHEETS—SHEET 2.

Witnesses

Inventor
John W. Crowley

UNITED STATES PATENT OFFICE.

JOHN W. CROWLEY, OF CHICAGO, ILLINOIS.

CLUTCH.

1,165,392.

Specification of Letters Patent. Patented Dec. 28, 1915.

Application filed February 26, 1915. Serial No. 10,681.

*To all whom it may concern:*

Be it known that I, JOHN W. CROWLEY, a citizen of the United States, residing at Chicago, in the county of Cook and State of Illinois, have invented certain new and useful Improvements in Clutches, of which the following is a specification.

My invention relates to improvements in clutches and has especial reference to friction-engaging, self-locking clutches.

One of the objects of my invention is to provide a clutch which possesses all of the beneficial advantages of friction clutches, to initiate engagement of the parts and of jaw clutches wherein the engaging members are more positively secured together, whereby to connect a part to be rotated to a rotating part.

Another object of my invention is to generally improve clutches; to cheapen and simplify their construction and to provide an improved method of operation.

Other and further objects of my invention will become readily apparent, to persons skilled in the art, from a consideration of the following description when taken in conjunction with the drawings, wherein—

Figure 2:
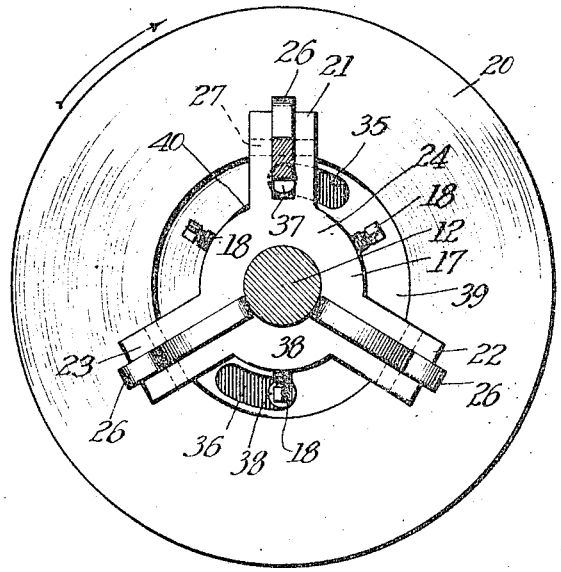
Figure 3:
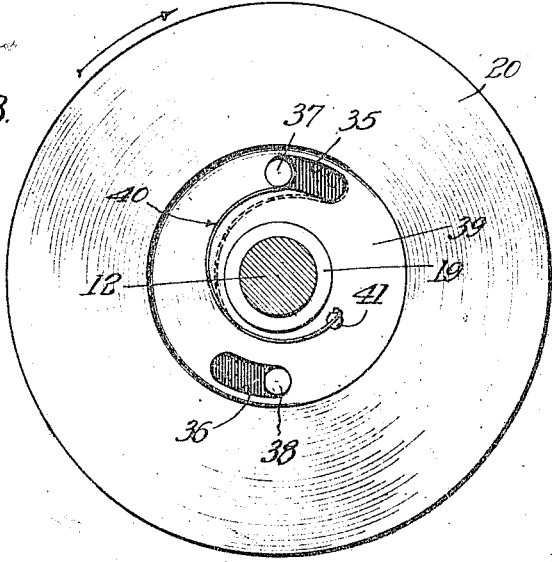

Figure 1 is a longitudinal section of an exemplification showing my invention. Fig. 2 is a transverse section, taken on line 2—2 of Fig. 1. Fig. 3 is a similar section taken on line 3—3 of Fig. 1; Fig. 4 is a similar section taken on line 4—4 of Fig. 1 showing the means for adjusting one element of the clutch with relation to the other. Fig. 5 is a perspective view of a cap screw used in connection with said adjusting means. Fig. 6 is a radially movable feather operable by said screw.

In all the views the same reference characters are employed to indicate similar parts.

My clutch may be advantageously used for connecting a driving pulley or wheel, with a shaft to be rotated, or it may be used for connecting two axially disposed sections of a shaft together. In the drawings I have shown the clutch used for the first mentioned purpose and will explain, in connection therewith, how it may be employed for either use.

An essential portion of the clutch consists of a disk 10 which forms one member or element of the clutching mechanism. It is also, preferably, an integral part of the sleeve 11, which in the particular showing is freely rotatable upon the shaft 12. A driving, or a driven pulley 13, is secured to the sleeve 11 by means of a key or feather 14, as shown, or by any other suitable means. A collar 15 is secured to the shaft 12 as by the set screw 16, and in connection with the three armed spider 17, which is secured to the shaft by the set screws 18—18, prevents longitudinal movement of the sleeve 11 upon the shaft. The sleeve 11 is preferably reduced, as at 19, to receive a freely longitudinally movable disk or plate 20, which is centrally perforated for the purpose. The disk or plate 20 forms another element of the clutching mechanism. The disks 10 and 20 are each transversely tapered, or have their confronting surfaces inclined at an angle from a plane perpendicular to their axis as shown in Fig. 1. The thin portion of disk 10 is shown to be at the top of the figure and the thicker portion at the bottom, while the relative thick and thin parts of disk 20 is reversed, the thick portion of disk 20 being at the top and the thin portion at the bottom.

The spider 17 is provided with three arms 21, 22 and 23, forming integral parts of the hub portion 24, and slotted, as at 25, for reception of levers 26, which are pivoted in the respective slots, as upon pin 27. These levers are provided with a projecting shorter portion or foot 28 the toe of which bears against the disk 20, to initiate the frictional contact of the disks, and an inwardly turned curved longer end portion 29. When the end portion 29, of the lever 26, is radially moved away from the shaft 12, the foot portion 28 will push the disk 20 into initial contact with the disk 10.

An axially movable cone structure 30 is loose upon the shaft 12 and is provided with an annular groove 31 which is engaged by a forked shifting lever 32, as usual in such devices. When the cone member 30 is moved axially of the shaft 12 toward the clutch, the tapered portion 33 thereof will raise the ends 29 of the levers 26 until said ends rest upon the flat annular portion 34. At this time, the foot ends 28, of each of the levers 26, will press the disk 20 into contact with the confronting surface of the disk 10 and serve as abutments to prevent outward axial movement of disk 20. Assuming now that the disk 10 is being driven by the pulley 13, the frictional contact of the disk 20 with a disk 10, initially produced by the parts 28, will cause the disk 10 to rotate to a limited degree ahead of the disk 20 so that the thicker portions of the two disks will more nearly approach the same transverse plane; the disk 20 operating as a wedge between the foot parts or abutments 28, of the levers 26, and the disk 10, thereby causing a more positive engagement between the rotatable member or spider 17, which is fixed to the shaft 12, and the disk 10, which before clutching engagement, rotates freely upon said shaft. The slight rotation of the disk 10 with respect to the disk 20, is automatic in its operation and the resulting locking action between the parts 28 and disk 20 is thus effected after the initial engagement of the two disks by the manual movement of the levers 26. Owing to the uniform and like tapering of the disks 10 and 20, the same wedging effect will be produced under each of the abutments 28, of the levers 26 as the taper is on the inside surfaces and the outside surfaces of the disks 10 and 20 are at all times parallel with each other, their outer surfaces being always in truly radial planes at right angles to the axis.

In order that the automatic locking operation of the clutch members may be more quickly performed when the levers 26 are raised from the shaft 12, by the axial movement of the cone 30, I prefer to provide one or more circumferentially extending slots 35 and 36 in the disk 20 and to secure pins or studs 37 and 38, one in each slot and extending into the disk 10 and to permit them to project through the disk 20. In carrying this feature of my invention into effect I prefer to counter-bore the disk 20, as at 39, to provide a recess in which to contain a spring 40 so that the studs or pins 37 and 38 need not be made to project beyond the outside surface of the disk 20. The spring 40 is in contact with one of the studs 37, as shown in Fig. 3, and is secured to the disk 20, as at 41. The spring yieldingly holds the rear portions of the slots 35 and 36 in contact with the pins 37 and 38 respectively. Two or more such springs may be used with as many studs and slots if desired. When the disks 10 and 20 have been pressed together, in a manner heretofore described, by means of the fingers or levers 26, the pins 37 and 38 will move forwardly in the slots, being positively carried by the disk 10, disk 20 being stopped or slowed down by friction imposed upon them by the parts 28, until thicker portions of the disk 10 are thereby moved forwardly, with reference to given portions of the disk 20, causing or producing a wedging effect, by the relative slip of the disks, between the disk 10 and the abutments 28 of the levers 26, thus automatically effecting a more positive, substantially wedging lock between the parts 28 and disk 20. To disengage the clutch members it is only necessary to axially move the cone 30 in the opposite direction to that of its initial movement, along the shaft 12, when the fingers 26 will resume their normal positions, shown in Fig. 1, and the disk 20, being released, will be rotated forwardly with reference to the disk 10, by the spring 40, the studs 37 and 38 being again brought into contact with the rear edges of said slots, respectively. During the time of the engagement of the clutch members the disk 10 may automatically move forwardly only a relatively short distance, so that the pins 37 and 38 will move in the slots 35 and 36, respectively, a correspondingly short portion of the movement permitted and will be returned to normal positions after the disks have been disengaged, in a manner described.

The device is entirely operable without the use of the pins or studs and the respective slots and in many constructions I may prefer not to use the pins and slots.

To adjust the disk 10 axially of the shaft, with reference to the spider 24, I counter-bore the outer end of the sleeve 11, as at 48, and interiorly screw thread the bore and provide a screw threaded plug 49 to fit within said counter-bore screw threaded recess of the sleeve. At intervals, around the circumferences of the threaded shank of the plug 49, as at 50, I axially slot the shank of the plug, thereby to provide feather ways for engagement by the radially movable feather 51 and I perforate and slot the sleeve 11, as at 52, to permit radial movement of the feather 51 by the screw 53. I cut an annular groove 54 around and near the lower end of the screw 53, for engagement with the slot 55 in the radially movable feather 51. The slot 55 has inwardly projecting confronting shoulders 56, that lie within the annular groove 54 of the screw so that when the screw is moved axially the feather will follow it. The feather 51 is caused to engage one or the other of the slots 50 when the plug 49 is rotated thus locking the plug in adjusted position. The enlarged end or head of the plug 49 normally bears against the collar 15 which is fixed to the shaft 12. To adjust the disk 10 axially of the shaft it is only necessary to turn the screw 53 outwardly of its screw threaded engagement with the sleeve 11 until the feather 51 is brought out of the notch 50 which it then occupies in the plug 49. The plug 49 is then rotated, by means of an ordinary spanner or wrench until the disk 10 is brought more closely toward the spider 24, or, when the plug 49 is rotated in the opposite direction, until the disk 10, with its connected sleeve 11, are drawn away from the spider 24. It is desirable to rotate the plug 49 until another of the notches 50 is brought into register, in a radial plane with the feather 51, when the screw 53 is rotated until the feather 51 is carried thereby into the underlying groove of the plug and thereby the plug is held in its adjusted position. By this means of adjustment the threads, on the screw threaded shank of the plug 50 are not mutilated as would be the case if the screw 53 was brought directly into contact with the said threads and by this means accurate and fine adjustment is effected.

While I have herein shown a single embodiment of my invention for the purpose of a clear disclosure, it is manifest that structural departure from the specific showing may be made within the scope of the appended claims.

Having described my invention, what I claim is:—

1. In a device of the character described, two rotatable members; a transversely tapered, rotatable disk, axially fixed to one said member; a transversely tapered, relatively loose, axially movable disk, parallel with the first disk; an axially fixed support rotatably secured to the other rotatable member and means frictionally connecting said rotatable disk and said support and adapted to move said axially movable disk into engagement with the fixed disk.

2. In a device of the character described, a member to be rotated; a rotatable disk axially fixed thereto; an axially and rotatably freely movable parallel disk, said disks inclined at an angle from a plane at right angles to their axis at their confronting surfaces; another member to be rotated; a support axially fixed to said last named rotatable member; a movable abutment, carried thereby and adapted to frictionally engage the movable disk and simultaneously move the same into frictional engagement with the first mentioned disk, whereby the relative rotation of said disks wedge the same apart increasing the frictional engagement of the movable disk and abutment.

3. A device of the character described comprising driving and driven members; a pair of disks, relatively rotatable and axially movable, the adjacent parallel surfaces of said disk lying in confronting planes inclined from a plane perpendicular to their axis of rotation and adapted for frictional engagement, one of said disks being secured to one of said members; means carried by the other member to produce relative rotation of said disks with respect to each other and to provide an abutment between which and one of said disks the other said disk is wedged to increase the frictional engagement between the last mentioned disk and said means.

4. In a device of the character described, the combination of a shaft; two rotatable parallel tapered disks, one of which is axially fixed and the other movable rotatively and axially; a spider fixed to said shaft; levers pivoted in said spider adapted to push said disks into contact and to afford abutments against which to wedge the movable disk and means for moving said levers.

5. In a device of the character described, the combination of a shaft; a collar fixed thereto; a clutch member rotatable with said shaft; a clutch member rotatable on said shaft between the clutch member rotatable with the shaft and the collar and having a counterbored threaded part; a threaded plug adapted to bear against said collar, adjustable in said part and provided with a series of axially parallel grooves in its threaded periphery and a movable feather in said clutch member, radially adjustable to engage and disengage said grooves.

In testimony whereof I hereunto set my hand in the presence of two subscribing witnesses.

JOHN W. CROWLEY.

In the presence of—
 JOSEPH A. CROWLEY,
 FORÉE BAIN.